UNITED STATES PATENT OFFICE.

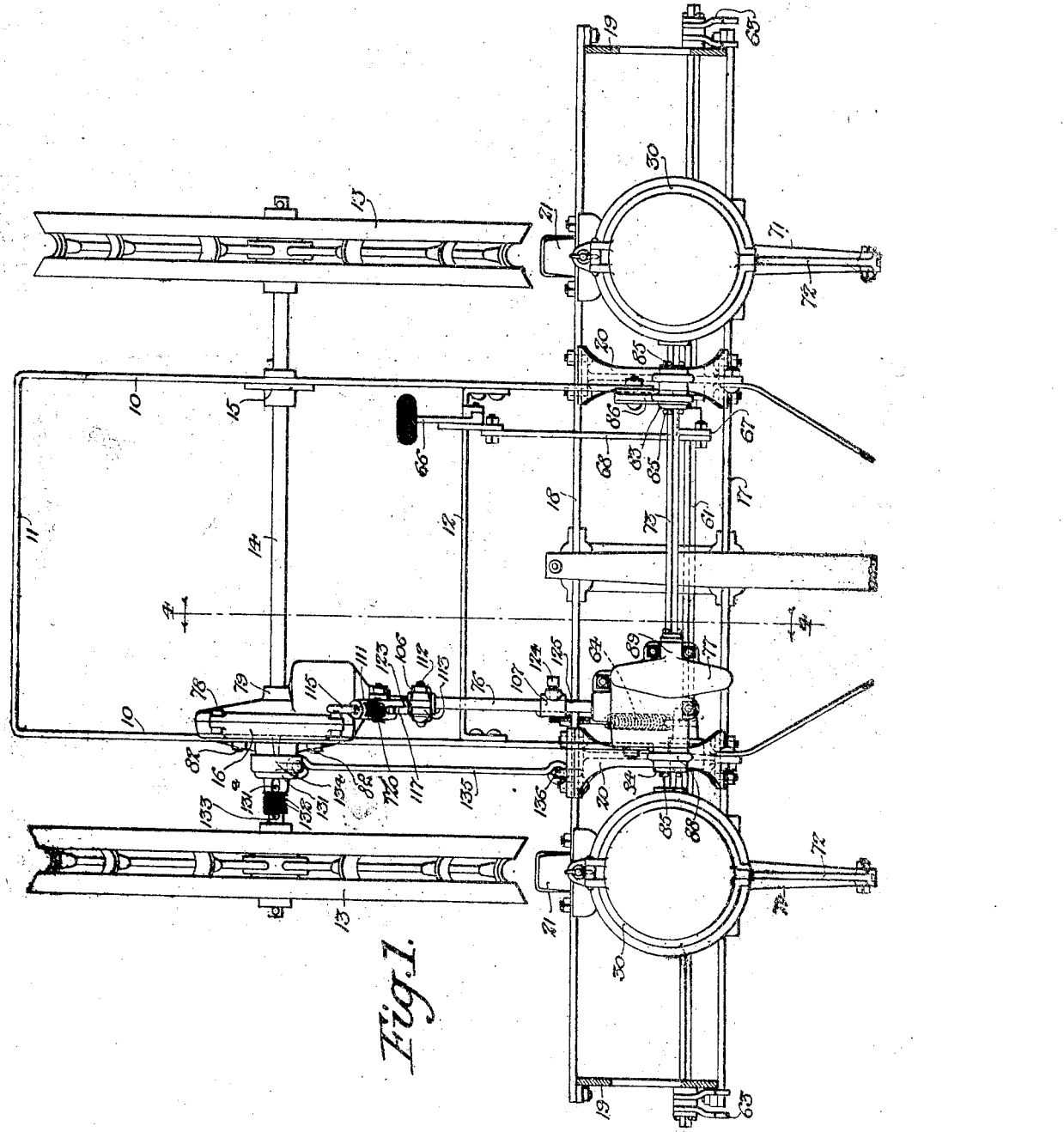

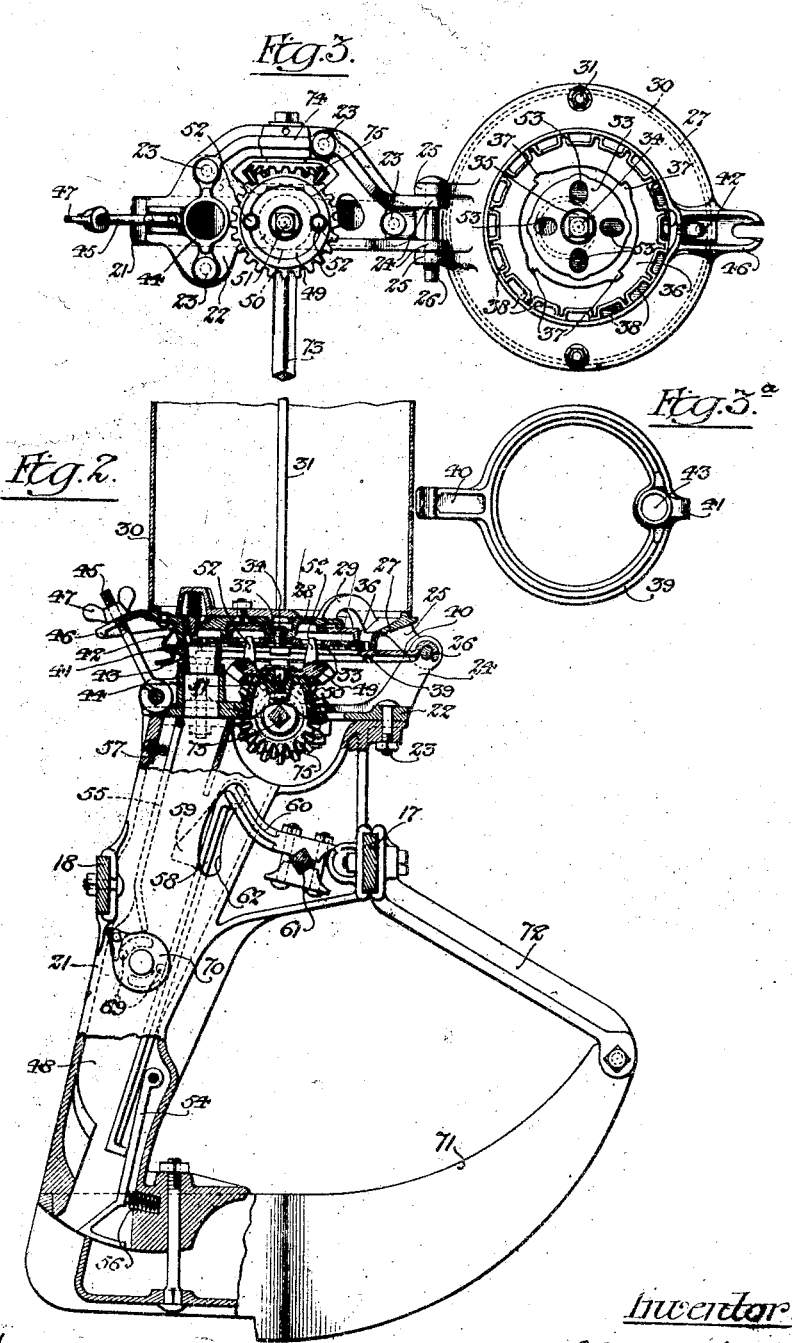

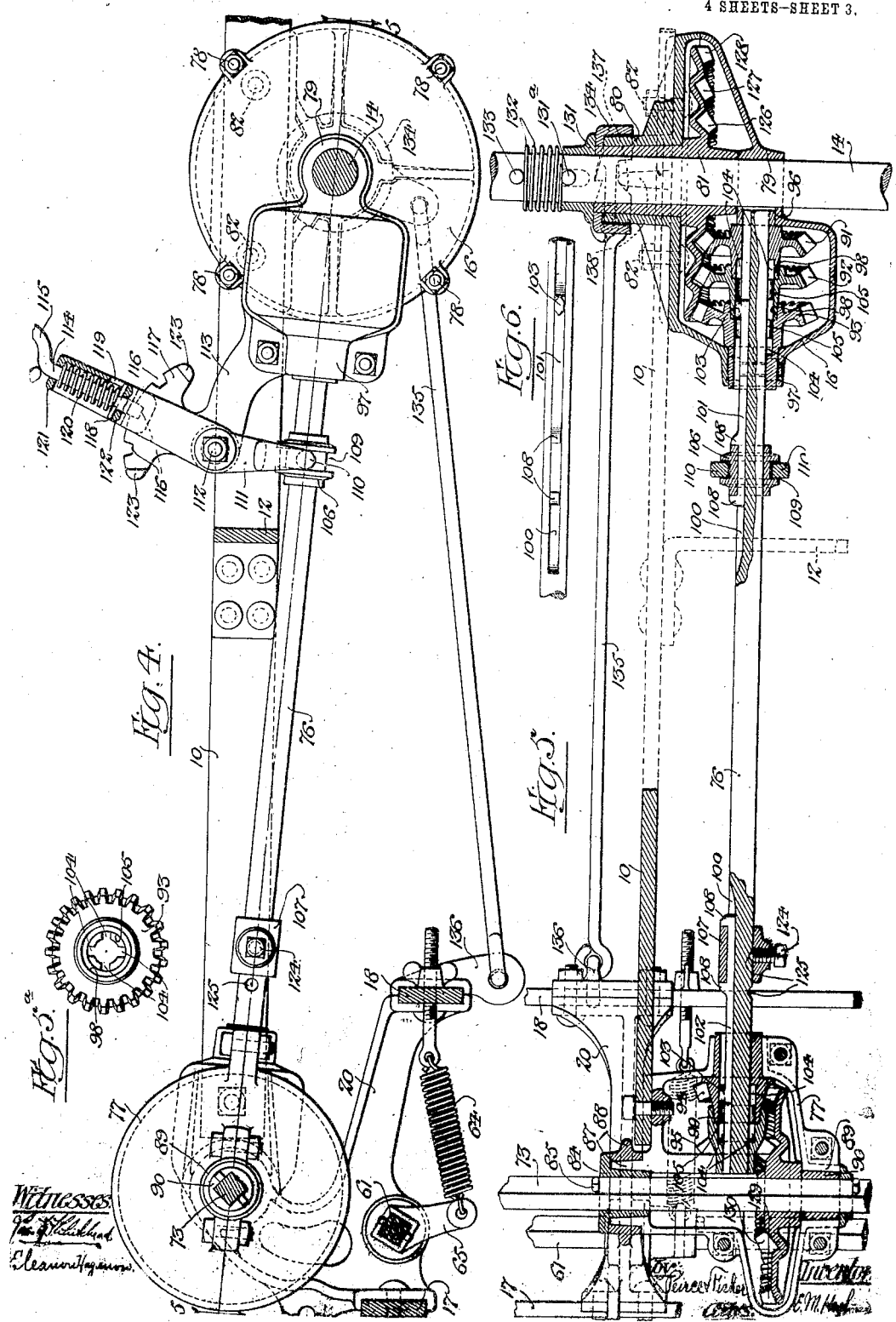

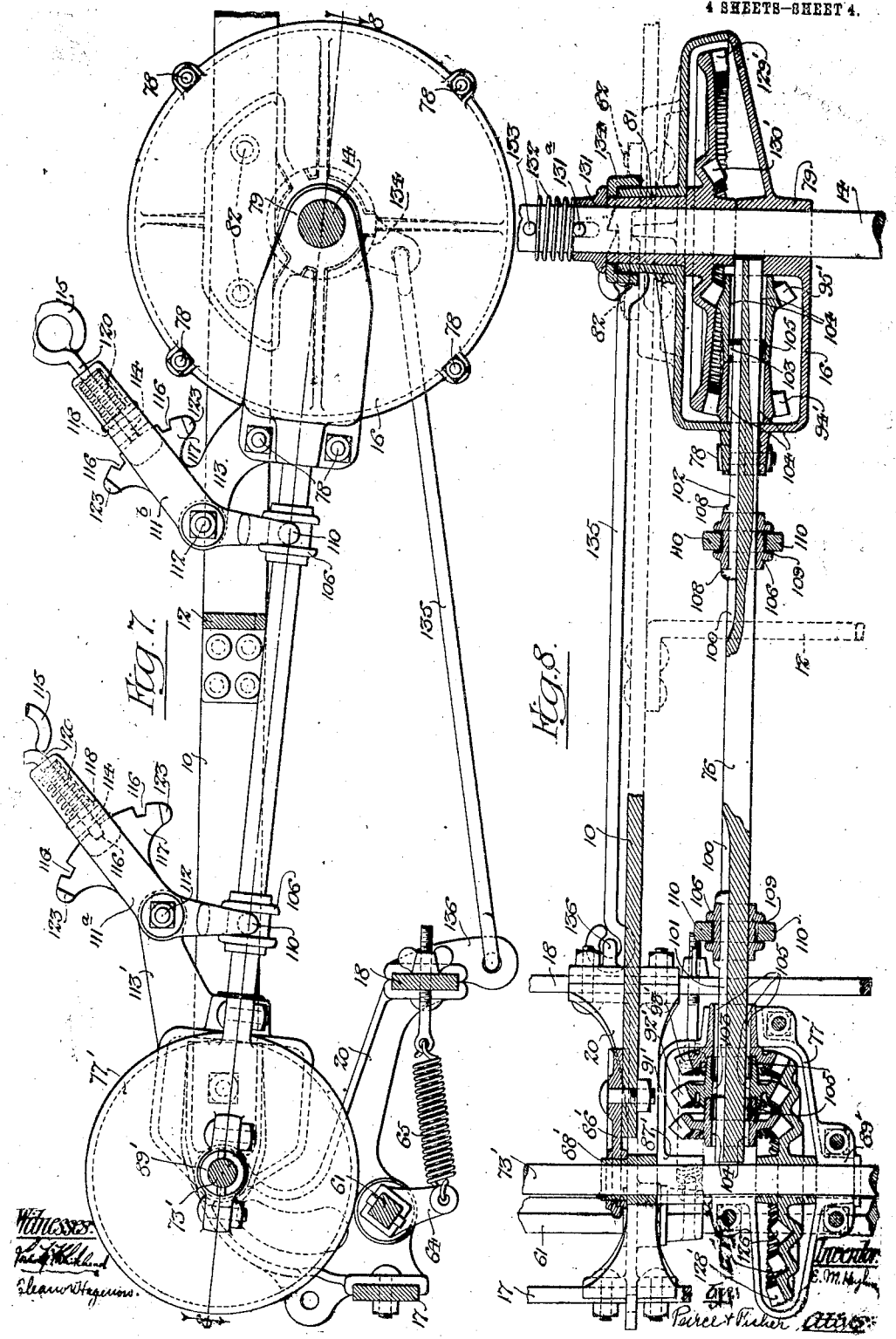

EDWARD M. HEYLMAN, OF JANESVILLE, WISCONSIN, ASSIGNOR TO THE JANESVILLE MACHINE COMPANY, OF JANESVILLE, WISCONSIN, A CORPORATION.

CORN-PLANTER.

1,118,932.  Specification of Letters Patent.  Patented Dec. 1, 1914.

Application filed January 20, 1909. Serial No. 473,339.

*To all whom it may concern:*

Be it known that I, EDWARD M. HEYLMAN, a citizen of the United States, and a resident of Janesville, county of Rock, and State of Wisconsin, have invented certain new and useful Improvements in Corn-Planters, of which the following is a specification.

The invention relates to seed planters that are adapted for both hill and drill planting. In such planters, for check-row or hill planting, the seed mechanism is operated to accumulate the seed, usually one at a time, as the machine travels between rows and the accumulated seed is deposited at the hills by means of valve mechanism operated by the check-row wire. In drilling, the check-row mechanism is thrown out of operation and the seed mechanism acts to deposit the seed in the furrow, usually one at a time. It is desirable to vary the number of kernels deposited in each hill and to vary the distances between the deposited seed in drill planting in accordance with the different soil conditions. This is usually effected by having a number of seed-plates in which the seed cells are differently arranged, but this method is objectionable because of the time and labor necessary to change the seed-plates, and because it cannot be used practically to vary the planting in accordance with the soil conditions at different parts of the same field.

The object of the present invention is to provide variable drive mechanism for the seed-plates which can be easily and readily set or adjusted to control the amount of seed planted, either in hill or drill planting.

Most corn planters, as now manufactured, are provided with a clutch by which the seed-plates are intermittently operated in check-row planting. These clutch mechanisms frequently get out of order and are the cause of much annoyance and they cannot be conveniently inclosed within a protecting casing, and a further object of the invention is to provide a variable drive mechanism for the seed-plates which will obviate the necessity of employing a clutch and which can be entirely inclosed within a protecting casing.

With these objects in view, the invention consists in the features of improvement hereinafter set forth, illustrated in the accompanying drawings and more particularly defined in the appended claims.

In the drawings, Figure 1 is a plan view of the improved planter; Fig. 2 is a view partially in elevation and partially in vertical section of one of the seed-delivery mechanisms; Fig. 3 is a plan view of a portion of the seed-delivery mechanism with the seed-can swung back upon its pivot; Fig. 3ᵃ is an inverted plan view of the retainer ring for the seed plate; Fig. 4 is an enlarged detail view with parts in section on the line 4—4 of Fig. 1; Fig. 5 is a horizontal section on the line 5—5 of Fig. 4; Fig. 5ᵃ is a view in elevation of one of the pinions of the drive mechanism; Fig. 6 is a detail view of a portion of the counter shaft carried thereby; Figs. 7 and 8 are views similar to Figs. 4 and 5 and illustrating a modification of the invention.

The frame of the planter is of usual form and comprises side-bars 10 that are connected at their rear ends by a cross-bar 11 and adjacent their forward ends by a cross-bar 12. Supporting and covering wheels 13 are fixed to the end of a wheel axle 14 that is journaled at one end in a boss 15 fixed to one of the side-bars 10 and at its other end extends through a gear casing 16 which is secured to the other side-bar.

The front transverse frame which carries the seeding mechanisms, comprises front and rear bars 17 and 18 connected at their ends by cross pieces 19 and intermediate their ends by transverse brackets 20. The brackets 20 are pivoted to the forward ends of the side-bars 10 of the main frame so that the front frame and seeding mechanisms carried thereby can be raised and lowered in the usual manner to and from working position. The two seeding mechanisms are carried upon the front frame directly in advance of the supporting and covering wheels 13. These mechanisms are alike and each comprises a boot 21 that is secured in position between the front and rear bars 17 and 18 of the front frame. A support 22 is secured to the upper end of the boot 21 by bolts 23. A pair of upwardly-projecting lugs 24 on the forward part of the support 22 extend between a pair of lugs 25 on the bottom of the seed-can or hopper and are connected thereto by a pivot pin 26. The bottom of the seed-can comprises a rim portion 27 and a cap-plate 28 that are connected by arches 29. The body 30 of the seed-can is secured to the outer portion of the rim 27 by bolts 31 in the usual manner. The cap-plate 28 is provided on its under side with a shouldered boss 32 upon which a rotatable drive-plate 33 is mounted, the drive-plate being held in position upon the boss by a screw-bolt 34 and a washer 35. The seed-plate or ring 36 fits within the lower portion of the rim 27 and is provided at its inner edge with notches arranged to be engaged by lugs 37 upon the drive-plate 33. The seed-plate is provided at its outer edge with cells 38, each of which is preferably adapted to receive a single kernel of corn in edgewise position. The outer sides of the cells are closed by the vertical, depending portion of the rim 27 of the hopper bottom. The lower ends of the cells are closed and the seed-plate is removably held in position by a retainer ring 39, shown in detail in Fig. 3ª. This retainer ring is provided at one side with a projecting hook 40 that is adapted to engage the pivot pin 26 between the lugs 24. At its opposite side, the ring is provided with a lug 41 that engages a spring catch 42 fixed to the hopper bottom. In the normal, operative position of the parts, a downwardly depending boss 43 on the ring 39 rests upon an upwardly projecting boss 44 upon the rear portion of the support 22 and the hopper is held in this position by an eye-bolt 45 pivoted to the support and arranged to engage a slotted lug 46 at the rear side of the hopper bottom. The bolt is provided with a wing-nut 47 that engages the lug 46, as shown in Fig. 2. A discharge opening is formed through the abutting bosses 43 and 44 through which the seed is delivered, one at a time, by the rotating seed-plate or ring 36 into the discharge chute 48 of the boot 21.

The seed-plate or ring 36 is driven by a beveled gear 49 that is rotatably mounted upon an upwardly-projecting boss 50 on the support 22, the gear being held in place thereon by a bolt 51. This gear is provided with a pair of diametrically arranged upwardly extending pins or lugs 52 which are arranged to engage two of the openings 53 in the drive-plate 33, so that the plate 33 rotates with the gear and in turn drives the seed-plate or ring 36. By loosening the thumb-nut 47, the seed-can may be swung back upon the pivot bolt 26, as shown in Fig. 3. The retainer ring 39 can then be removed and the plate readily changed if desired. The lugs 52 are of such height that the seed-can cannot be fully returned to its normal, operative position unless the lugs properly register with two of the openings 53 in the plate 33, so that the seed-plate is always in proper timed relation to its driving gearing.

The discharge chute 48 of the boot 21 is provided at its lower end with a pivoted discharge valve 54 and at its upper end with a pivoted check valve 55. When the planter is used for check-row or hill planting, a spring 56 normally holds the discharge valve 54 in position to close the lower end of the chute 48 and a spring 57 normally holds the check valve 55 against a reciprocating plunger 58 arranged within the chute 48. As the seeds forming one hill are accumulated upon the check valve 55, the previously accumulated hill rests upon the discharge valve 54. When the plunger 58 is reciprocated by the check-row devices and is moved downwardly so that its lower end opens, the discharge valve 54 thrusts the hill of corn thereon out into the furrow. At the same time, a lug 59 on the upper end of the plunger 58 engages the check valve 55 and opens it so that the hill of corn accumulated thereon drops onto the discharge valve. The plunger 58 is thus reciprocated by a crank arm 60 on the check-row rock-shaft 61. This arm is provided with an offset pin which extends through a segmental slot 62 in the boot 21 and engages the upper end of the plunger 58. The check-row rock-shaft 61 is journaled in the cross-pieces 19 and 20 of the front runner-frame and carries forks 63 upon its ends which are arranged to be engaged by the knots on the check-row wire. As usual, a spring 64 (see Figs. 1, 4 and 7) is connected to an arm 65 on the check-row rock-shaft and to the rear bar 18 of the front frame so as to hold the rock-shaft and parts connected thereto in the normal position illustrated in the drawings. The shaft 61 may also be rocked by a foot-lever 66 mounted upon the cross-bar 12 of the main frame and connected to an arm 67 on the rock-shaft by a link 68. For drill planting, the valves 54 and 55 are held open, so that the seeds delivered by the plate drop directly through the chute 48 into the furrow. The valves are held open by a pair of pins 69 upon a disk 70 pivoted to the side face of the boot 21. These pins extend through segmental slots in the sides of the boot and engage the valve 55 and the plunger 58 to hold the valves open, as shown in Fig. 2. By shifting this plate from the position shown in Fig. 2, the springs 57 and 56 will return the valves 54 and 55 to closed position for check-row planting.

To the lower end of each boot is secured the rear end of a furrow-opening shoe 71. The forward end of the shoe is connected by a brace 72 to the front bar 18 of the front frame of the planter.

The seed-plates of both the seed mechanisms are driven from a transverse shaft 73 that is journaled at its ends in bearings 74 (see Fig. 3) formed in the supports 22. At each end, the shaft 73 is provided with a beveled pinion 75 which meshes with the adjacent beveled gear 49. Power is transmitted from the wheel axle 14 to the transverse shaft 73 through the medium of a longitudinally extending counter shaft 76 that is connected at its end by two sets of beveled gears to the wheel axle and to the transverse shaft respectively. One set of beveled gears is inclosed in the casing 16 and the other in the casing 77. The gear casing 16 is formed of two circular sections connected together at their edges by bolts 78. The wheel axle 14 extends through both sections of the gear casings and the inner section is provided with a bearing 79 therefor. The other section of the gear casing 16 is provided with a bearing 80 within which a reduced portion of a gear hub 81 rotatably fits and this section of the gear casing is rigidly secured by bolts 82 to the adjacent side-bar 10 of the main frame.

In the form of the invention shown in Figs. 1 to 5, the transverse shaft 73 is square in section and is provided with bearing sleeves 83 and 84 held in place thereon by pins 85. The bearing sleeve 83 (see Fig. 1) rotatably engages suitable bearings in one of the cross pieces 20 of the front frame and in a short piece 86 that is securely bolted to the forward end of one of the side-bars 10 of the main frame. The other bearing sleeve (see Fig. 5) rotatably engages a bearing 87 in one end of the gear casing 77. This casing is divided into two semi-circular sections and the bearing 87 thereon is in turn journaled in a bearing 88 in the adjacent cross piece or bracket 20. The opposite end of the gear casing is provided with a bearing 89 for the reduced portion of a gear hub 90. The longitudinally extending counter shaft 76 is journaled at its ends in the gear casings 16 and 77 and the construction permits of the pivotal movement of these gear casings upon the wheel axle 14 and transverse shaft 73 respectively. Moreover, the gear casing 77 and the short piece 86 are securely bolted respectively to the forward ends of the side-bars 10 of the main frame, so that the pivoted points of connection between the main frame and the front frame and the axis of the transverse shaft 73 are coincident. This construction permits the proper shift of the main and front frames to move the seeding mechanism to and from working position without cramping the counter shaft 76 or the beveled gears connected thereto. The counter shaft 76 is provided with two sets of beveled pinions, one at each end. One set comprises the pinions 91, 92 and 93 at the rear end of the shaft in the form shown in Figs. 1 to 5, and the other set comprises the beveled pinions 94 and 95 at the forward end of the shaft. The set of beveled pinions 91, 92 and 93 are arranged within the gear casing 16 and the hubs of the end pinions 91 and 93 are provided with reduced extensions journaled in bearings 96 and 97 formed in the gear casing. The hubs of the pinions 91 and 92 are each provided with an extension 98 which seats within a recess or bearing in the hub of the adjacent pinions 92 and 93. This construction provides an increased length of bearing for the several pinions which would otherwise be quite short because of the compact arrangement. In a similar manner, the hubs of the pinions 94 and 95 are provided with extensions journaled in bearings in the gear casing 77 and the hub of the pinion 94 is provided with an extension 99 which rotatably seats within a recess in the hub of the gear 95. The ends of the counter shaft 76 extend through the hubs of the two sets of pinions and this shaft is provided at its ends with key-ways 100 within which are arranged a pair of shiftable keys 101 and 102. The ends of these keys are provided with a projecting lug 103 which is arranged to engage key-ways 104 formed in the hubs of the pinions. By shifting the keys longitudinally, any one of the set of pinions 91, 92 and 93 can be locked to the counter shaft and either one of the set of pinions 94 and 95 can be locked to the counter shaft. As shown in each set of pinions, there is an annular space 105 between the key-ways of the different pinions; that is to say, the hubs of the pinions 92 and 93 are provided with such annular recesses or spaces and the hub of the pinion 94 is similarly provided with an annular space. These annular spaces are slightly greater in width than the lugs 103 upon the keys 101 and 102, so that these lugs are entirely disengaged from one pinion before they can engage a key-way of the next adjacent pinion. It is thus impossible to lock more than one of each of the two sets of pinions to the counter shaft, and the keys may be shifted without danger of breakage while the drive mechanism is in operation. Preferably, the lugs 103 upon the keys are provided with beveled ends (see Fig. 6) to facilitate their engagement with the key-ways 104 of the pinions. As shown in Fig. 5ª, all of the pinions of both sets are provided with four key-ways any one of which may be engaged by the lug 103 of the corresponding key.

Shifters are provided for the keys 101 and 102 in the form of collars 106 and 107 which surround the counter shaft 76, and each of which is engaged by a pair of lugs 108 upon the outer end of the corresponding key. The collar 106 is provided with a slot 109 which is engaged by pins 110 upon the forked end of a shift lever 111. This lever is connected by a pivot bolt 112 to an arm 113 that is formed on and projects from the gear casing 16. The upper end of the shift lever 111 is provided with a recess within which is arranged a longitudinally movable dog or latch 114 that is provided with an eye 115 at its upper end. This dog is arranged to engage any one of a series of three notches 116 formed in a segment 117 on the arm 113. A cross-pin 118 extends through the inner end of the dog or latch 114 and through a slot 119 in the side of the shift lever 111. This pin holds the dog or latch 114 against twisting but permits its longitudinal movement into and out of engagement with the notches 116. A spring 120 coiled about the dog or latch extends between a shoulder 121 upon the outer end of the shift lever 111 and the cross pin 118 and normally presses the dog or latch inwardly and holds it in engagement with one of the notches 116. In normal position, the pin 111 engages a shoulder 122 on the shift lever 111 and limits the inward movement of the dog or latch. The eye 115 upon the upper end of the dog or latch is within easy reach of the operator upon the machine and by grasping it he can withdraw the dog or latch and then shift the lever 111 to engage the lug 103 upon the key 101 with any one of the three pinions 91, 92 or 93. The movement of this shift lever and of the key is limited by lugs 123 upon the ends of the segment 117. The shifting collar 107 in the form shown in Figs. 1 to 5 inclusive, is provided with a set screw 124 which is arranged to engage either one of two recesses 125 in the side of the counter shaft 76 and thus locks the key 102 in position with its projection 103 engaging a key-way in either of the pinions 94 or 95.

The set of pinions 91, 92 and 93 mesh with a set of gears 126, 127 and 128 of different sizes. These gears are preferably formed in one piece and form a single multiple-faced gear on the hub 81 through which the wheel axle 14 extends. The set of pinions 94 and 95 mesh with two gears 129 and 130, which are preferably formed in one piece, and form a multiple-faced gear upon the hub 90 through which the transverse shaft 74 extends. When the seeding mechanisms are in lowered, working position, the gear hub 81 is connected to the wheel axle 14 by a ratchet-toothed clutch sleeve 131 which is keyed to the wheel axle by a cross pin 131ª but is shiftable longitudinally thereon. A spring 132 coiled about the wheel axle, extends between a cross-pin 133 and the clutch sleeve 131 and normally tends to hold it in engagement with the end of the gear hub 81. A clutch shifter 134 is rotatably mounted upon the end of the gear hub 81 and upon the bearing 80 of the gear casing 16 and is connected by a link 135 to a lug 136 on the rear bar 17 of the front frame. The clutch shifter is provided with one or more cam notches 137 on its inner edge which coöperate with projecting lugs 138 upon the adjacent side face of the gear casing 16. When the forward end of the main frame and the front runner frame are raised to lift the seeding mechanism from working position, the clutch shifter 134 is rocked by the connecting link 135 and the cams 137 ride up upon the lugs 138 and force the clutch sleeve 131 outwardly against the pressure of the spring 132 to disengage the teeth of the clutch sleeve from the ratchet teeth in the gear hub 81. When the parts are restored to the working position illustrated in the drawing, the spring 132 automatically restores the clutch sleeve to the position shown to connect the gear hub 81 to the wheel axle. By shifting the keys 101 and 102, the two sets of beveled gears at the opposite ends of the transmission or counter shaft 76 may be adjusted to vary the speed of the transverse shaft 73 and the seed-plate driven thereby relatively to the forward movement of the machine. The seed-plates are thereby variably operated to deposit different numbers of seeds at the hills in hill planting and to plant the seeds at different distances apart in drill planting. The mechanism dispenses with the use of a clutch and the seed-plates are continuously driven both in drill and check-row planting. The intermeshing sets of beveled gears are definitely proportioned in accordance with the size of the wheels 13 and the number of holes in the seed-plate, so that the drive mechanism, when used for check-row planting, will, at each of its different adjusted positions, advance the seed-plate through definite arcs each containing a definite number of seed cells as the machine travels the predetermined distance between rows. For example: the form shown in Figs. 1 to 5 inclusive is adapted for use with a 16-hole seed-plate, wheels of thirty inches in diameter and with the standard distance, i. e., forty-two inches between rows. In this form, the beveled gears 33 which directly rotate the seed-plates are provided with twenty-four teeth and the beveled pinions 75 on the shaft 73 are provided with eighteen teeth, so that the ratio between the shaft 74 and the seed-plates is as three to four. Each of the beveled pinions 94 and 95 upon the forward end of the counter shaft 76 are provided with twelve teeth, while the gears 129 and 130 with which they mesh are provided respectively with thirty-six and eighteen teeth. The ratio between the counter shaft 76 and transverse shaft 74 is, therefore, as one to three when the gears 94 and 129 are in operation with the key 102 in the position shown in Fig. 5 to lock the pinion 94 to the transmission shaft. When the key is shifted to lock the pinion 95 to the transmission shaft, the ratio between this shaft and the shaft 74 will be as two to three. When the planter is used for check-row or hill planting, the key 102 will always be in the position shown in the drawings with the gears 94 and 129 in operation. The ratio therefore, when the machine is used for planting in hills between the counter shaft 76 and the seed-plates will be as four to one. In this form, all of the pinions 91, 92 and 93 are provided with twenty teeth while the intermeshing gears 126, 127 and 128 are provided respectively with twenty-three, thirty-four and forty-six teeth. When the shift lever 111 is set in position with the dog 114 in the front notch 116 of the segment 117, the lug 103 on the key 101 will engage a key-way or seat in the beveled pinion 91 and lock it to the counter shaft 76. The counter shaft will then rotate through one-half of a revolution as the machine travels forwardly for forty-two inches or the distance between rows. The seed plates will therefore be rotated through one-eighth of a revolution as the machine travels between rows and will each accumulate two seeds in the discharge chute of the corresponding boot between the operations of the valve mechanism therein effected by the knots on the check-row wire. Under such circumstances, therefore, two seeds will be planted in each hill. When the shift-lever 111 is in position with its dog 114 engaging the center notch 116, the key 101 will lock the beveled pinion 92 to the transmission shaft and it will rotate through three-quarters of a revolution as the machine advances from one row to the next or from one knot on the check-row wire to the next knot, and the seed-plates will be advanced through three-sixteenths of a revolution so that three seeds will be deposited at each hill. With the shift lever 111 in position to bring its dog or latch 114 in the rearmost notch 116, the beveled pinion 93 will be locked to the counter shaft 76 and the seed-plate will be advanced through one-fourth of a revolution so that four kernels will be deposited in each hill. In this way, the drive mechanism may be set in any one of three positions to effect the planting either of two, three or four kernels in a hill. The gearing mechanism is thus so proportioned that, in each of its different adjustments, the seed plates will be rotated through definite arcs each containing a definite number of seed cells as the machine travels the predetermined distance between rows, such arcs and the number of cells contained therein being uniform in any one adjustment of the gear mechanism, but varying with the different adjustments thereof. It is obvious that the change from one position to another can be readily and easily effected while the machine is in operation, so that the planting may be varied to suit the soil conditions at different parts of the same field. With the arrangement of gearing set forth, it will be noted that the transmission shaft rotates through some multiple of one-fourth of a revolution as the machine travels between rows, so that by having four key seats 104 in the beveled pinions the change can be made from one position to another without missing a single hill. With this arrangement, it will be impossible to lose more than one kernel in a hill when making the change for the purpose of planting two, three or four kernels. It should be noted that one of the key-ways 104 in the outside pinions 93 and 94 of each set extends entirely through the hub so that the keys 101 and 102 with the projecting lugs 103 thereon may be inserted in position therethrough in assembling the parts of the machine.

For drill planting the check-row mechanism is of course not used and the valves of the discharge chute are held open, as shown in Fig. 2. The key 102 may then be used to lock either of the pinions 94 or 95 to the counter shaft 76 and the key 101 can be shifted to lock any one of the set of pinions 91, 92 or 93 to the counter shaft. With the particular size of gears shown, seed may then be drilled with a sixteen-hole plate at 5, 7, 10, 12, 14 and 20 inches apart. By changing the seed-plates the distances can of course be varied.

It will be understood that the sizes of the gears of the drive mechanism can be varied from those given without departure from the essentials of the invention, but for hill planting, as stated, the gearing must be definitely proportioned in accordance with the size of the wheels and the number of seed cells in the plate in order that the proper number of seed shall be accurately deposited in the hills. When the drive mechanism is thus definitely proportioned, it is not necessary to employ a clutch to effect the intermittent operation of the seed-plates and the gear connections of the drive mechanism can be entirely inclosed within protecting casings and is in no way dependent for its proper action upon springs, clutches or the like. The use of a clutch is supposed to obviate the inaccurate planting of seed in spite of the irregular rotation of the ground wheels due to unevenness of the surface of the ground and to slipping of the wheels, but where the seed is accumulated, one at a time, by seed-plates having single-kernel cells any such variation in the movement of the ground wheels can not make a difference of more than one kernel in any hill and that only at very great intervals.

In the form of the drive gearings shown in Figs. 7 and 8, the parts are similar to those already set forth except that the set of three beveled pinions are arranged on the forward end of the counter shaft 76 and mesh with a triple faced gear on the transverse shaft 73', and the set of two beveled pinions mounted upon the rear end of the counter shaft 76 and mesh with a double faced gear upon the wheel axle. In this form, the pinions 91', 92' and 93' are each provided with twenty-one teeth while the pinions 94' and 95' are each provided with twelve teeth. The gears 129' and 130' have respectively forty-eight and twenty-seven teeth while the gears 126', 127' and 128' have twenty-one, twenty-eight and forty-two teeth respectively. Both of the keys in this form are manipulated by shift levers 111ᵃ and 111ᵇ similar to the shift lever 111 previously described. The key 102 is always set in position to lock the pinion 95' to the counter shaft 76 when the machine is used for check-row or hill planting and the shift lever 111ᵃ is moved to any one of its three positions to effect the planting of two, three, or four kernels in a hill. In this form, with a sixteen-hole plate and thirty inch wheels the transverse shaft 73' must be geared to the seed-plate in the ratio of four to one or, if desired, it may be geared to the seed-plate in the ratio of one to one and a four to one gearing interposed between the wheel axle 14 and the multiple faced gear that meshes with the pinions 94' and 95'. In this form, the transverse shaft 73' is round in section and is journaled directly in bearings 87' and 89' in the casing 77', so that the latter is thus swiveled on the shaft to move thereon when the parts of the machine are shifted to and from working position. This shaft is also directly journaled in bearings 88' in the transverse bracket 20 and the forward ends of the frame bars 10 are securely bolted to the pieces 86' that rotatably engage reduced portions or projections of the bearings 88'.

It is obvious that numerous changes may be made in the details set forth without departure from the essentials of the invention.

I claim as my invention:—

1. In a check-row corn planter, the combination of a wheeled frame, a seed hopper on said frame having a delivery chute, a valve mechanism in said chute, a seed plate in said hopper having single kernel cells for accumulating seed one at a time in said chute, a variable gear mechanism driven from a wheel of said frame and connected to said plate to continuously rotate the same, shifter means for adjusting said gear mechanism to vary the speed of rotation of said plate, check-row devices for intermittently and uniformly operating said valve mechanism, said gear mechanism being definitely proportioned in accordance with the size of said wheel and the number of cells in said plate, and arranged, in each different adjustment, to continuously rotate said plate and advance the same through definite arcs each containing a definite number of cells as the machine travels the predetermined distance between cross rows, such arcs and the number of cells contained therein being uniform in any one adjustment of said gear mechanism, but varying with the different adjustments thereof, and said gear mechanism and said check-row devices being arranged to simultaneously and independently operate said seed plate and said valve mechanism in proper timed relation, substantially as described.

2. In a check-row corn planter, the combination of a wheeled frame, a seed hopper thereon having a delivery chute, a valve mechanism in said chute, a seed plate in said hopper having single kernel cells for accumulating seed one at a time in said chute, variable gear mechanism driven from a wheel of said frame and connected to said seed plate to continuously rotate the same, a controlling device, manually shiftable during the operation of the machine, for adjusting said gear mechanism to vary the speed of rotation of said plate, and check-row devices operatively connected to said valve mechanism, said gear mechanism and said check-row devices being arranged to operate simultaneously and independently to continuously and variably rotate said seed plate and intermittently and uniformly actuate said check-row devices in proper timed relation to deposit a definite number of seed in each hill in accordance with the adjustment of said gear mechanism, substantially as described.

EDWARD M. HEYLMAN.

Witnesses:
RACHEL C. PURCELL,
JOSEPH A. CRAIG.